US009520744B2

(12) United States Patent
Vogman

(10) Patent No.: US 9,520,744 B2
(45) Date of Patent: Dec. 13, 2016

(54) REDUCING POWER LOSSES IN A REDUNDANT POWER SUPPLY SYSTEM

(71) Applicant: Intel Corporation, Santa Clara, CA (US)

(72) Inventor: Viktor Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 14/041,548

(22) Filed: Sep. 30, 2013

(65) Prior Publication Data
US 2014/0028100 A1   Jan. 30, 2014

Related U.S. Application Data

(63) Continuation of application No. 12/459,421, filed on Jun. 30, 2009.

(51) Int. Cl.
H02J 9/06 (2006.01)
H02J 9/00 (2006.01)
G06F 1/26 (2006.01)

(52) U.S. Cl.
CPC ............... H02J 9/005 (2013.01); G06F 1/263 (2013.01); H02J 9/061 (2013.01); Y10T 307/615 (2015.04)

(58) Field of Classification Search
CPC ..... Y10T 307/615; Y10T 307/625; H02J 9/00; H02J 9/04; H02J 9/06; H02J 9/061; G06F 1/263
See application file for complete search history.

(56) References Cited

U.S. PATENT DOCUMENTS

| 4,675,538 | A  | 6/1987  | Epstein |
| 5,347,164 | A  | 9/1994  | Yeh |
| 5,734,204 | A  | 3/1998  | Sobue |
| 6,114,775 | A  | 9/2000  | Chung et al. |
| 6,198,177 | B1 | 3/2001  | Mao et al. |
| 6,249,411 | B1 | 6/2001  | Hemena et al. |
| 6,307,356 | B1 | 10/2001 | Dwelley |
| 6,825,726 | B2 | 11/2004 | French et al. |
| 7,002,263 | B2 | 2/2006  | Inn et al. |
| 7,200,015 | B1 | 4/2007  | Mirskiy |
| 7,239,119 | B2 | 7/2007  | Baurle et al. |
| 7,256,569 | B2 | 8/2007  | Wu et al. |
| 7,312,962 | B1 | 12/2007 | Zansky et al. |

(Continued)

OTHER PUBLICATIONS

Vogman, et al. "Cold Redundancy—A New Power Supply Technology for Reducing System Energy Usage"; IDF2009 Intel Developer Forum; 33 pages, Dated Jul. 27, 2009.*

(Continued)

Primary Examiner — Brian Misiura
(74) Attorney, Agent, or Firm — Schwabe, Williamson & Wyatt, P.C.

(57) ABSTRACT

A power supply system includes at least a first power supply module and at least one redundant power supply module. The at least one power supply module supplies power to an output terminal. The at least one redundant power supply module operates in a first state and in a second state. In the first state the second power supply module supplies power to the output terminal. In the second state the second power supply module provides standby power and operates in a burst mode (for example, such as a discontinuous conduction mode).

22 Claims, 10 Drawing Sheets

(56) References Cited

U.S. PATENT DOCUMENTS

| | | | |
|---|---|---|---|
| 7,321,174 B2 * | 1/2008 | Jones | G06F 1/30 307/66 |
| 7,564,148 B2 | 7/2009 | Powell | |
| 7,615,965 B2 | 11/2009 | Popescu-Stanesti et al. | |
| 7,679,217 B2 | 3/2010 | Dishman et al. | |
| 7,705,488 B2 | 4/2010 | Clemo et al. | |
| 7,759,964 B2 | 7/2010 | Dishman et al. | |
| 7,765,416 B2 | 7/2010 | Zhou et al. | |
| 7,777,368 B2 * | 8/2010 | Randall | H02J 9/061 307/81 |
| 7,802,121 B1 | 9/2010 | Zansky et al. | |
| 7,877,622 B2 | 1/2011 | Gruendler | |
| 7,903,437 B2 | 3/2011 | Chang et al. | |
| 7,906,871 B2 | 3/2011 | Freeman et al. | |
| 7,982,339 B2 | 7/2011 | Yeh et al. | |
| 8,035,356 B2 | 10/2011 | Mentelos | |
| 8,035,995 B2 | 10/2011 | Young et al. | |
| 8,040,703 B2 | 10/2011 | Melanson | |
| 8,067,856 B2 | 11/2011 | Carter et al. | |
| 8,281,172 B2 | 10/2012 | Humphrey et al. | |
| 2004/0003306 A1 | 1/2004 | Oomori | |
| 2006/0049811 A1 | 3/2006 | Farkas | |
| 2008/0315858 A1 | 12/2008 | Hong et al. | |
| 2009/0158070 A1 | 6/2009 | Gruendler | |
| 2009/0167089 A1 | 7/2009 | Dishman et al. | |
| 2009/0237057 A1 | 9/2009 | Dishman et al. | |
| 2010/0039836 A1 | 2/2010 | Gong et al. | |
| 2010/0052426 A1 | 3/2010 | Carter et al. | |
| 2010/0077238 A1 | 3/2010 | Vogman et al. | |
| 2010/0327765 A1 | 12/2010 | Melanson et al. | |
| 2011/0213999 A1 | 9/2011 | Lecourtier | |
| 2011/0267856 A1 | 11/2011 | Pansier | |

OTHER PUBLICATIONS

"TEA1750 GreenChip III SMOS control IC"—Rev, 02; Dated Dec. 15, 2008, 29 pages.

Texas Instruments—"Understanding Boost Power Stages in Switchmode Power Supplies"—Dated Mar. 1999, 32 pages.

Malik et al., "Energy Efficiency, it's Benefits and Methods to close the Efficiency gap", IBM Research Triangle Park, NC, Poughkeepsie, NY, IEEE 2008, pp. 417-422.

Office Action received for U.S. Appl. No. 12/231,597, mailed on Jun. 28, 2010, 6 pages.

Non-Final Office Action mailed Mar. 9, 2016 for U.S. Appl. No. 14/041,535, 19 pages.

Final Office Action mailed Aug. 16, 2016 for U.S. Appl. No. 14/041,535, 12 pages.

Notice of Allowance mailed Oct. 28, 2016 for U.S. Appl. No. 14/041,535, 12 pages.

* cited by examiner

REDUCING POWER LOSSES IN A REDUNDANT POWER SUPPLY SYSTEM

RELATED APPLICATION

This application is a continuation of and claims priority to U.S. patent application Ser. No. 12/459,421 titled "REDUCING POWER LOSSES IN A REDUNDANT POWER SUPPLY SYSTEM," which was filed on Jun. 30, 2009; this application is entirely incorporated by reference. This application is related to U.S. patent application Ser. No. 12/231,597 filed on Sep. 4, 2008 entitled "Power Management System" to William W. Carter, Brian J. Griffith, and Viktor D. Vogman.

FIELD

The subject matter disclosed herein relates generally to the field of power supply management.

RELATED ART

Many types of electronic devices use power supply systems to ensure that the proper output power is available for use. Many power supply systems require relatively large amounts of input and output currents when input power is first applied and power supply gets activated. Power supply systems typically use soft start circuits for the purpose of preventing destruction of circuitry due to a rush current occurring at start-up and preventing overshoot in the waveform of an output voltage as it rises. However, soft start circuits provide slow power supply startup times.

Current power supply arrangements for computing platforms such as server platforms sometimes include use of redundant power supplies. However, the present inventor has identified that it would be beneficial to improve energy savings and reduce operating costs in such computing platforms that include redundant power supplies.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1A:
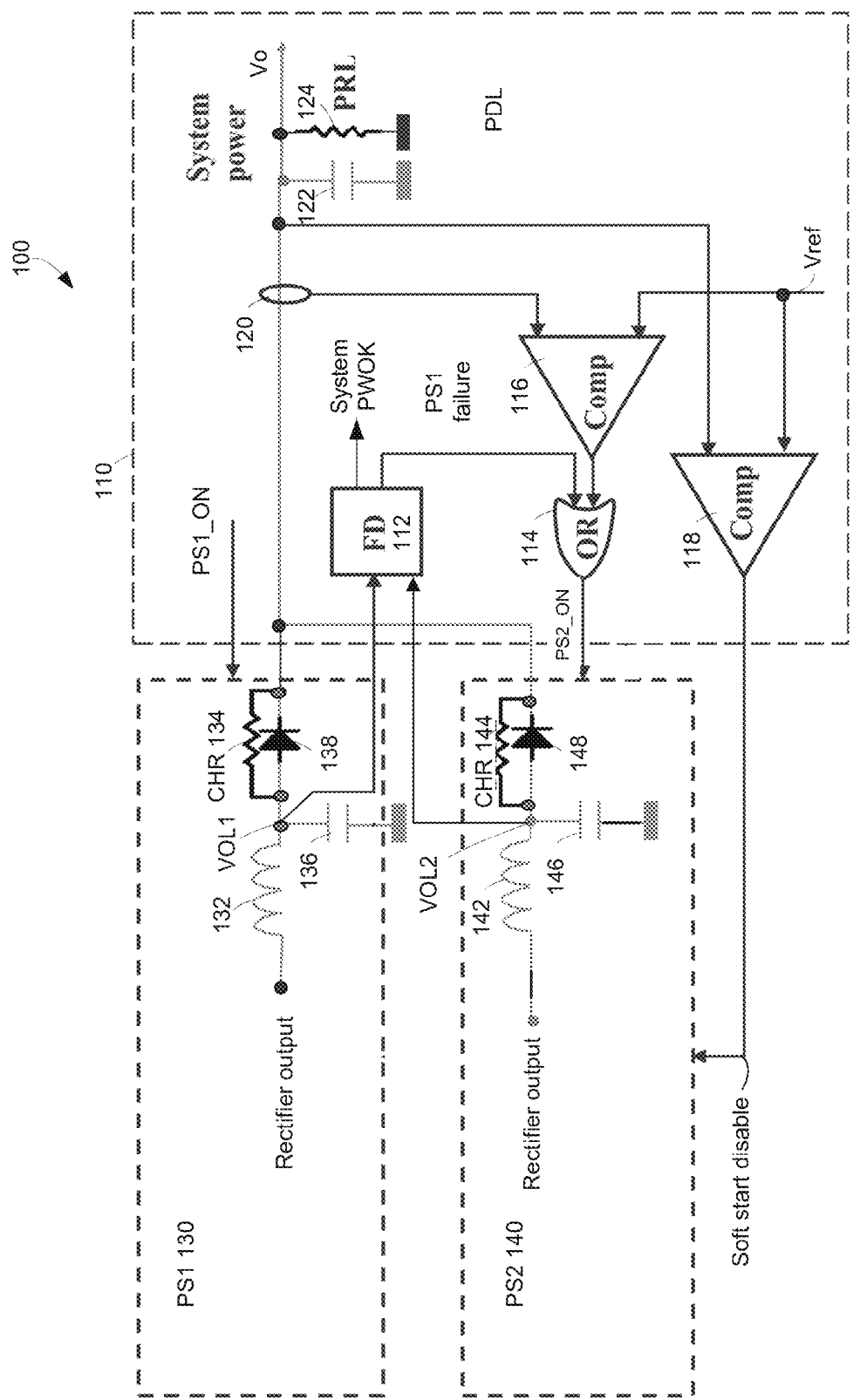
FIG. 1A depicts a functional block-diagram of a power supply system, in accordance with an embodiment of the present invention.

FIG. 1A depicts a functional block-diagram of a power supply system 100 in accordance with an embodiment of the present invention. System 100 may include power distribution logic (PDL) 110 that controls the power output of at least one power supply PS1 130 and at least one redundant power supply PS2 140. Additional power supplies can be added for control by PDL 110. PDL 110 controls whether one or both of PS1 130 and PS2 140 output power. Power supplies PS1 130 and PS2 140 may be implemented in substantially the same manner.

PDL 110 is capable of providing power at an output voltage terminal Vo. Current sensor 120 measures current to output terminal Vo. Comparator 116 may compare the measured current against first and second threshold values and output a control signal used to control whether power supply PS2 140 outputs power. Comparator 116 may turn off PS2 140 when the measured output current from all power supplies to terminal Vo falls below a first threshold level. Comparator 116 may turn on PS2 140 when the measured output current from all power supplies to terminal Vo rises above a second threshold level.

Power supply PS1 130 receives power supply enable signal PS1_ON whereas power supply PS2 140 receives power supply enable signal PS2_ON. Power supply enable signals control whether a power supply outputs power. For example, a computer system provides the power supply enable signal PS1_ON to cause output of power to terminal Vo.

Although not depicted, each of power supplies PS1 130 and PS2 140 includes conventional soft start logic that starts-up the power supplies. The soft start logic for power supply PS2 140 can be disabled by used of a soft start disable signal from comparator 118 of PDL 110.

Failure detector 112 may monitor the condition of the active power supplies PS1 130 and PS2 140. When an internal voltage of PS1 130 at terminal $V_{OL1}$ is below a threshold, failure detector 112 may cause assertion of signal PS2_ON to permit power supply PS2 140 to output power.

Failure detector 112 may also output signal System PWOK to indicate to a computer system that power output level is at an acceptable level. Failure detector 112 may output signal System PWOK in the active state when a voltage at terminal $V_{OL1}$ of PS1 130 is below a threshold but power supply PS2 140 outputs power to output terminal Vo. Failure detector 112 may output signal System PWOK in an inactive state when both power supplies PS1 130 and PS2 140 are inactive and the output voltage at terminal Vo is out of a regulated range. In other embodiments, logic separate from failure detector 112 may output signal System PWOK.

Each of PS1 130 and PS2 140 are capable of supplying output power to terminal Vo. The power supply outputs are connected in parallel, so the power supplies share common load. Capacitor 122 and preload resistor (PRLR) 124 are coupled to terminal Vo. Filter capacitors 136 and 146 are charged from terminal Vo as long as one power supply powers output voltage terminal Vo. Preload resistor (e.g., PRL 124) is placed on PDL 110 and OR-ing devices (e.g., diodes or MOSFETs) are bypassed with charging resistors (e.g., CHR1 134 and CHR2 144). Use of the resistors for charging filter capacitors 136 and 146 allow system 100 to avoid current spikes at redundant power supply turn-on and enables the cold redundant power supply module to turn on rapidly without using soft start.

In a hot redundant state (e.g., when PS1 130 and PS2 140 operate), charging resistors 134 and 144 are "shorted" by conducting diodes 138 and 148, so voltage drops across the charging resistors 134 and 144 are close to zero and the charging resistors 134 and 144 may not dissipate any noticeable power. In an off state (when neither PS1 130 nor PS2 140 operates) or in a cold redundant state once capacitor 146 is charged, there is no current flowing from the common bus (not shown) inside the power supply module, so the power dissipation in the charging resistors may be zero.

Figure 1B:
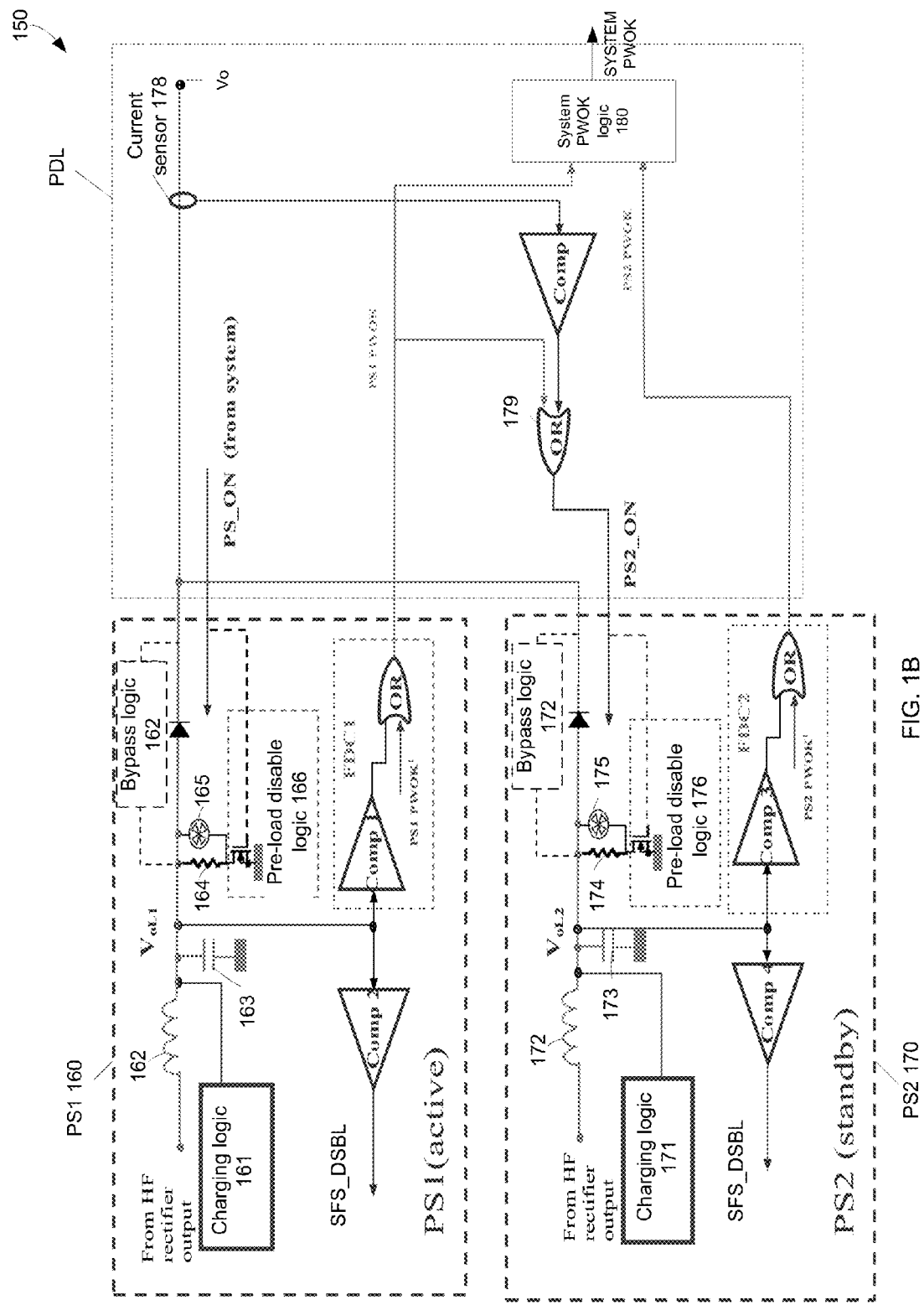
FIG. 1B depicts a functional block-diagram of another power supply system, in accordance with an embodiment of the present invention.

FIG. 1B depicts a functional block-diagram of a power supply system 150 in accordance with an embodiment of the present invention. Power supply PS1 160 operates in a similar manner as power supply PS2 170. One or more power supplies similar to power supply PS1 160 can be added to system 150.

Inductor 162 and output capacitor 163 may filter out DC content from a high frequency sequence of voltage pulses generated at the HF rectifier output.

Charging logic 161 may charge charging capacitor 163. Charging logic 161 may be implemented as a linear regulator that supplies power output of approximately 100 mW or as a housekeeping standby converter. Maintaining substantially fully charged charging capacitor 163 may allow power supply PS1 160 to start rapidly and without using soft start logic. Capacitor may alternatively be charged from the output voltage terminal Vo through bypass logic 162, similarly to the block diagram in FIG. 1A.

Pre-load disable logic 166 may disconnect preloading resistor 164 and fan 165 from a local bus (not depicted) when power supply PS1 160 is in standby mode (e.g., when input signal PS_ON is de-asserted). Disconnecting the preloading resistor 164 and fan 165 may reduce power consumption by power supply PS1 160 during charging of capacitor 163 and may permit output capacitor 163 to be charged from a very low power supply (e.g., charging logic 161) or directly from the output voltage terminal Vo through bypass logic 162. Preload disable logic 166 may be implemented as a solid state switch controlled by signal PS_ON.

Comparator Comp 2 may disable the soft start logic in power supply PS1 160 by asserting signal SFS_DSBL when internal voltage of PS1 160 at terminal $V_{oL1}$ reaches or approaches a lower regulation limit.

The following is a description of a manner to generate SYSTEM PWOK signal using PWOK signals from power supplies PS1 160 and PS2 170. Together, Comp1 and an OR logic form a fault detector FDC1 of PS1 160. FDC1 indicates to system PWOK generation logic 180 via signal PS1 PWOK that the internal voltage power supply PS1 is insufficient or its output voltage may soon go out of regulation limits. OR logic of FDC1 outputs PS1 PWOK based on inputs of the output of comparator Comp1 and an input of signal PS1 PWOK[1]. Comparator Comp1 of PS1 160 monitors a voltage at terminal $V_{OL1}$ of power supply PS1 160 and deasserts its input to OR logic of FDC1 when the voltage at terminal $V_{OL1}$ drops by approximately 2%. Signal PS1 PWOK[1] is an internal PWOK signal that is asserted when internal voltage $V_{oL1}$ is within regulation limits but is de-asserted approximately 1 ms before the voltage at terminal $V_{oL1}$ leaves regulation limits.

Similarly, comparator Comp3 and an OR logic form a fault detector FDC2 of PS2 170. FDC2 operates in a similar manner as FDC1 except the OR logic of FDC2 generates signal PS2 PWOK based on inputs of signal PS2 PWOK[1] and an output of comparator Comp 3. Signal PS2 PWOK[1] is an internal PWOK signal that is asserted when internal voltage $V_{oL2}$ is within regulation limits but is de-asserted approximately 1 ms before the voltage at terminal $V_{OL2}$ leaves regulation limits. Comparator Comp 3 deasserts its input to OR logic of FDC2 when the voltage at terminal $V_{OL2}$ drops by approximately 2%.

System PWOK generation logic 180 may indicate via signal SYSTEM PWOK whether system 150 is able to provide system power. Signal SYSTEM PWOK may assert when any of PS1 or PS2 PWOK signals is asserted or during transition time between when a primary power supply (e.g., PS1) fails and a redundant power supply (e.g., PS2) is enabled.

Figure 2:
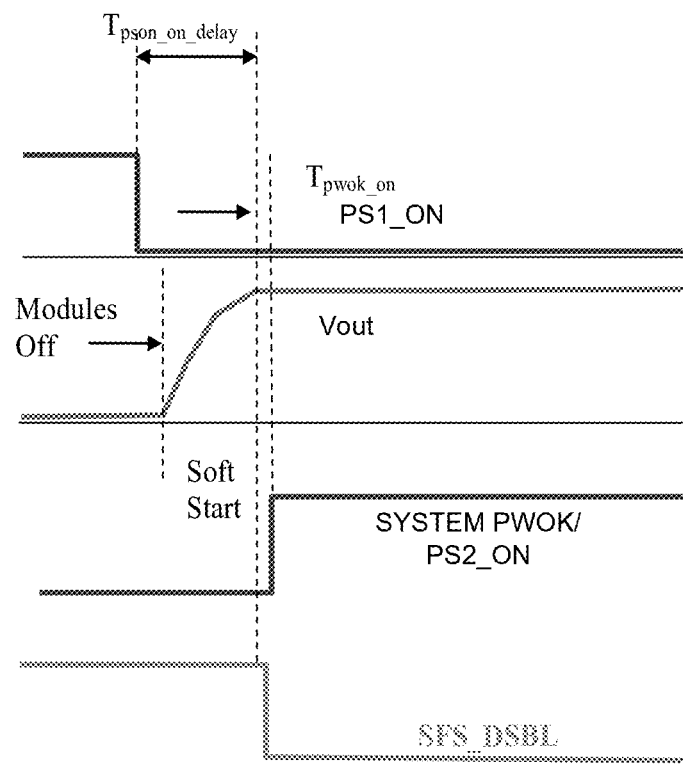
FIG. 2 depicts example signals generated during initial startup mode, in accordance with an embodiment of the present invention.

There are three major operating modes of systems 100 and 150: initial start, steady state operation, and power supply failure. FIG. 2 depicts example signals generated during the initial start mode, in accordance with an embodiment of the present invention.

The following describes operation of system 100 during initial turn on. Capacitors of the power supplies (e.g., capacitors 136 and 146) are discharged, so a recipient of power from system 100 enables power supply PS1 130 by asserting signal PS1_ON to logic zero to soft-start power supply PS1 130. Soft start circuitry gradually increases the duty cycle of voltage pulses generated at a rectifier output (filter input) terminal. As power supply PS1 130 outputs power, output capacitor 146 of power supply PS2 140 charges. When the output voltage at terminal Vo has reached its nominal level, comparator 118 causes signal SFS_DSBL to transition to logic zero and disable the soft start circuitry for power supply PS2 140. When total current detected by current sensor 120 reaches a specified threshold, comparator 116 asserts signal PS2_ON on the standby power supply PS2 140 through OR gate 114 so that power supply PS2 140 starts without using soft start. In addition, SYSTEM PWOK asserts to logic high after output voltage Vo reaches nominal level and is within regulation limit. Signal SYSTEM PWOK transitioning to logic high indicates that output power is available for consumption.

The following describes operation of system 150 during initial turn on. Capacitors of the power supplies (e.g., capacitors 163 and 173) are discharged, so the system enables power supply PS1 160 by changing signal PS_ON to logic zero to soft-start power supply PS1 160. Soft start logic gradually increases the duty cycle of voltage pulses generated at the output filter (inductor 162, capacitor 163) input. This causes voltage at terminal $V_{oL1}$ to increase gradually. As power supply PS1 160 outputs power, output capacitor 173 of power supply PS2 170 charges. Output capacitor 173 can receive power either from charging logic 172 or from internal charging logic 171. When voltage at terminal $V_{oL2}$ reaches nominal level, the soft start of PS2 170 is disabled via comparator Comp 4. When total current detected by current sensor 178 reaches a specified threshold, comparator Comp asserts signal PS2_ON through OR gate 179 so that power supply PS2 170 starts without using soft start. In addition, signal SYSTEM PWOK asserts high after output voltage at terminal Vo reaches nominal level and is within regulation limit. Signal SYSTEM PWOK transitioning to logic high indicates that output power is available for consumption.

Figure 3:
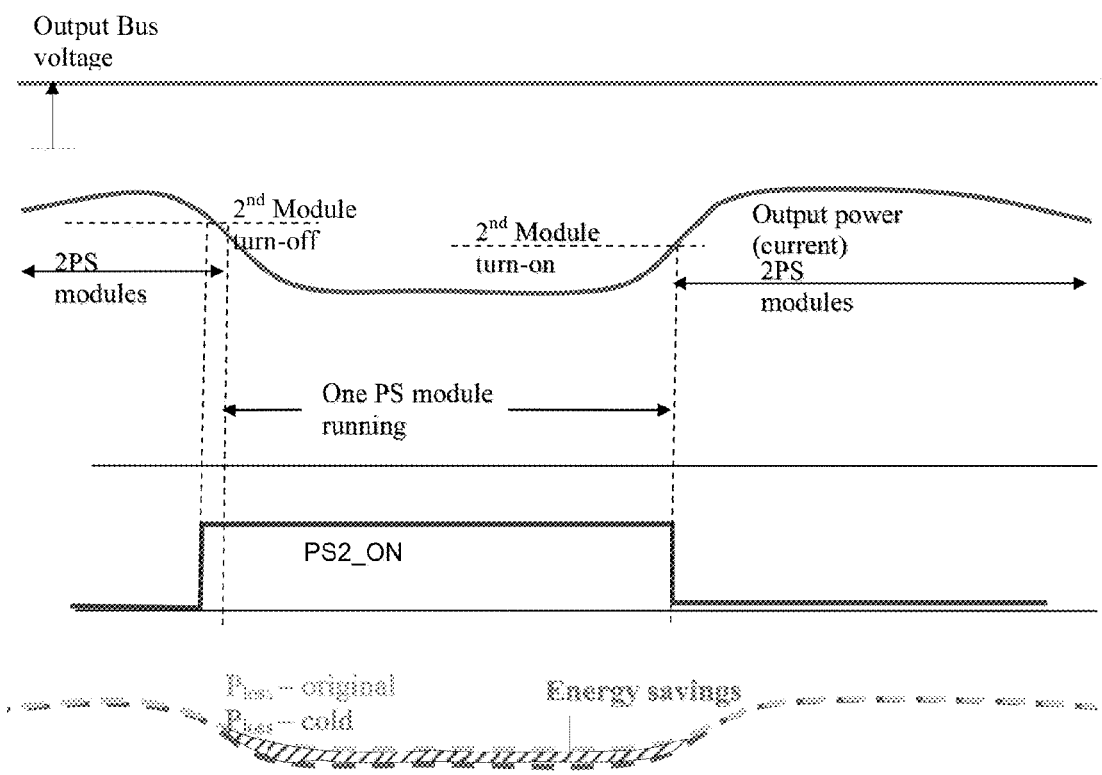
FIG. 3 depicts example signals generated during steady state operation, in accordance with an embodiment of the present invention.

FIG. 3 depicts example signals generated during steady state operation, in accordance with an embodiment of the present invention. The following describes operation of system 100 during steady state operation. The voltage at output voltage terminal Vo maintains approximately constant during the time period of this example. However, consumed power and current drawn from the power subsystem may vary in wide range. When the output current measured by current sensor 120 falls below a threshold, comparator 116 causes signal PS2_ON to de-assert by transitioning to logic one. Signal PS2_ON transitioning to logic one causes power supply PS2 140 to power off. While operating in cold redundant state, the system consumes less power because fixed losses from the one or more standby power supplies are eliminated. Because capacitor 146 of PS2 140 remains charged, standby power supply PS2 140 may be enabled, if needed, after a very short time. This allows for possible frequent transitions into and out of a cold redundant state. If total current (power) remains below specified predetermined threshold, which could be set within 20-40% of max rating, standby power supply PS2 140 may remain in the off (cold redundant) state with its output capacitor 146 charged from terminal Vo through charging resistor 144.

After total current (power) exceeds a predetermined threshold, comparator 116 causes signal PS2_ON to assert by transitioning to logic zero to power on redundant power supply PS2 140.

As depicted, energy savings results from transitioning the redundant power supply PS2 140 into cold redundant state. The energy savings of transitioning power supply PS2 140 into cold redundant state is shown as compared to energy use where power supply PS2 140 to continue to run.

The operation of system 150 during steady state operation is similar to the operation of system 100. When the output current measured by current sensor 178 falls below a threshold, comparator Comp causes signal PS2_ON to de-assert by transitioning to logic one. Signal PS2_ON transitioning to logic one causes power supply PS2 170 to power off. At least because of steady state output from terminal Vo, capacitor 173 remains charged either through bypass logic 172 or from charging logic 171, the standby power supply PS2 170 may be enabled after a very short time. After total current (power) exceeds a predetermined threshold, comparator Comp causes signal PS2_ON to assert by transitioning to logic zero to power on redundant power supply PS2 170.

Figure 4A:
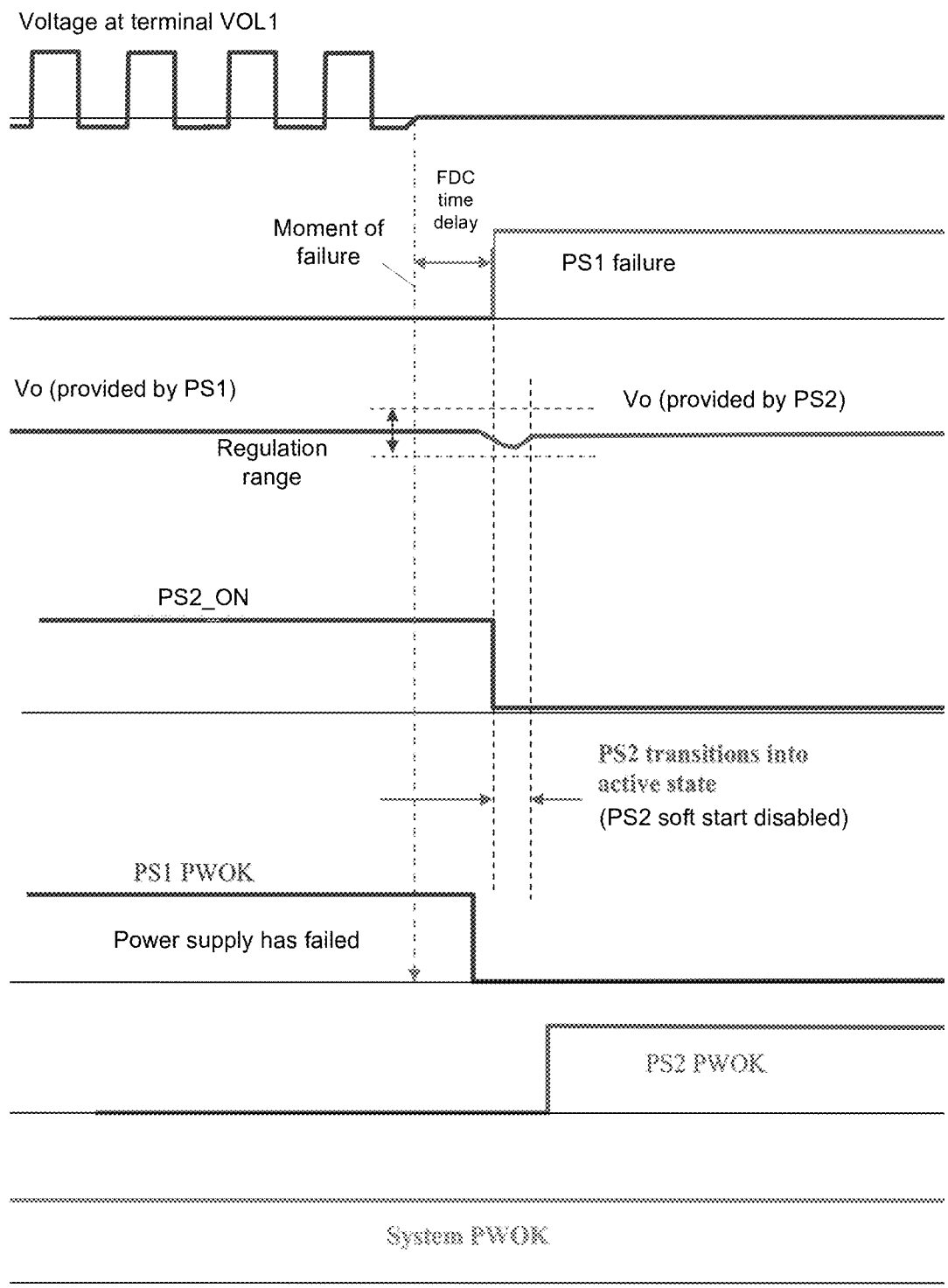
FIG. 4A depicts example signals generated during a power supply failure condition, in accordance with an embodiment of the present invention.

FIG. 4A depicts example signals generated during a power supply failure condition, in accordance with an embodiment of the present invention. The following describes operation of system 100 during a power supply failure condition. In this example FDC1 may be coupled to the output filter input, so when the active power supply PS1 fails and the pulses at rectifier output cease, failure detector 112 detects a failure within one cycle of the switching frequency of the pulses and asserts signal PS2_ON to power on the standby power supply PS2 140 through OR gate 114. The delay between failure detection and signaling the power supply PS2 140 to power on is shown as FDC time delay. Because the output voltage is at its nominal level, soft start for power supply PS2 is disabled. Accordingly, because capacitor 146 is fully charged, upon receiving signal PS2_ON, power supply PS2 starts at its max duty cycle with a minor delay. Starting of power supply PS2 with minor delay allows maintaining output voltage at terminal Vo within regulation tolerance even when primary source PS1 fails, or capacitor 136 fails into short.

Use of PWOK signals is well known in the art. PWOK signals indicate whether a power supply provides sufficient output voltage. Signal PS1 PWOK transitions to in active state after the moment of failure to indicate power supply PS1 130 is inactive. However, signal PS2 PWOK transitions to active state after the moment of failure to indicate power supply PS2 140 is active. Because of the rapid activation of power supply PS2 140, system power status signal system PWOK remains active.

Although not depicted in FIG. 1A or 4A, besides failure detector 112, the PW_OK of the active power supply could also be used as a failure detecting signal generated with 1-2 ms warning time.

The following describes operation of system 150 during a power supply failure condition. In this example, when the active power supply PS1 160 fails, the pulses at the filter input cease. FDC1 detects a failure within one cycle of switching frequency of the pulses, and de-asserts the PS1 PWOK signal to assert a signal PS2_ON from OR gate 179 to power on the standby power supply PS2 170. Because capacitor 146 is fully charged by charging logic 171 or from terminal Vo through bypass logic 172, in response to receiving the PS2_ON signal, power supply PS2 starts at its max duty cycle with a minor delay. Starting of power supply PS2 with minor delay allows maintaining output voltage at terminal Vo within regulation tolerance. An increase in the voltage at terminal $V_{OL2}$ of power supply PS2 causes FDC2 to assert signal PS2 PWOK. Signal SYSTEM PWOK stays asserted to signal that system power is available.

Figure 4B:
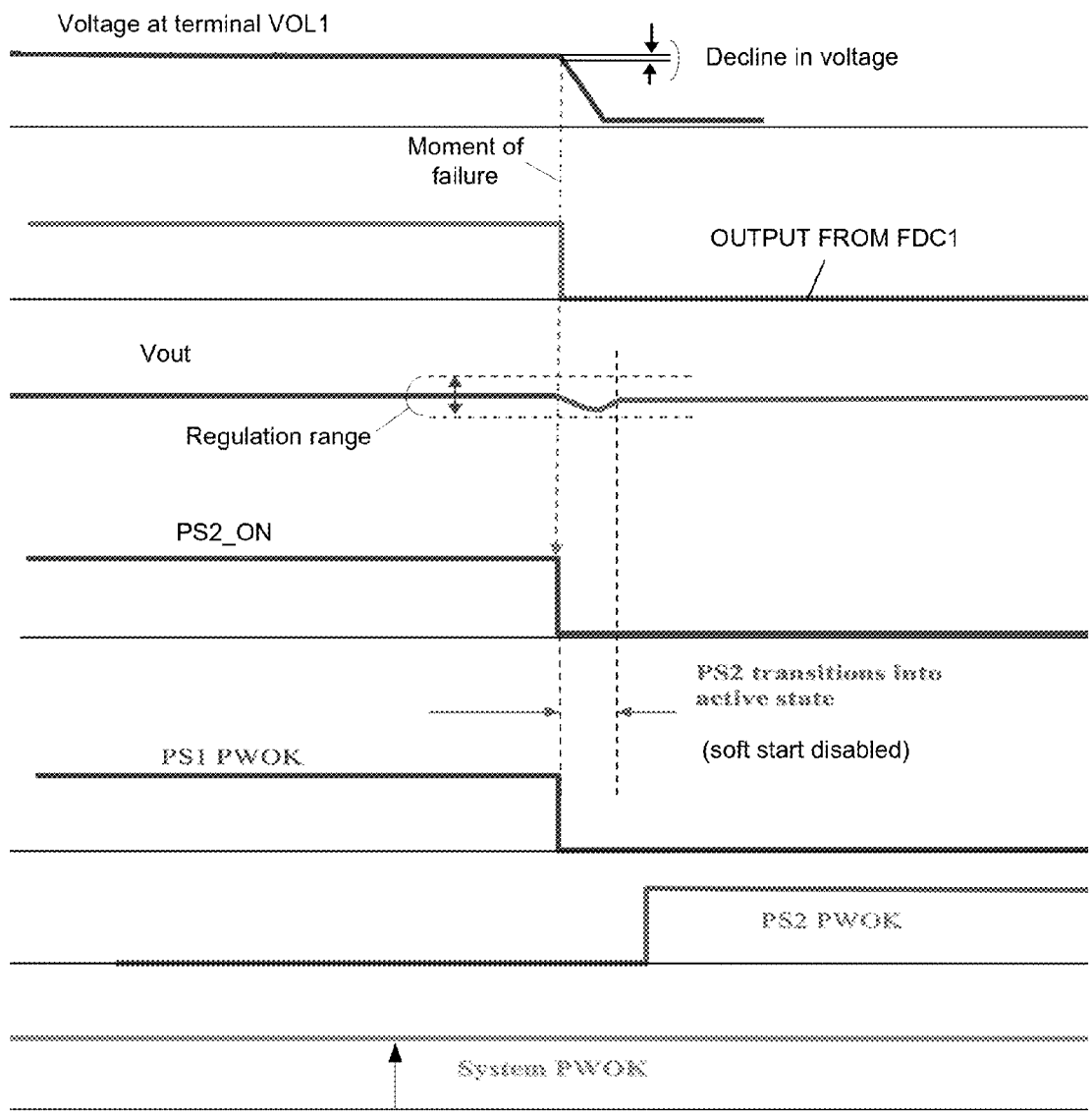
FIG. 4B depicts example signals generated during another power supply failure condition, in accordance with an embodiment of the present invention.

FIG. 4B depicts example signals generated during another power supply failure condition, in accordance with an embodiment of the present invention. This example is similar to the example of FIG. 4A, except that failure detection is based on a drop in internal voltages at terminal $V_{OL1}$ of power supply PS1 130/$V_{OL2}$ of power supply PS1 160 instead of failure to receive input pulses. When the active PS fails (e.g., PS1) and its internal output voltage drops by 2-3%, failure detector 112/FDC1 indicates failure and causes de-asserting signal PS1 PWOK and asserting of PS2_ON for the standby power supply PS2. Power supply PS2 transitions into its active state without a delay and maintains the output voltage at terminal Vo within regulation limits. Because of the rapid activation of power supply PS2, and system PWOK logic 180 maintaining high PWOK high during transition time period signal system, PWOK remains in an active state even though power supply PS1 failed.

Figure 5:
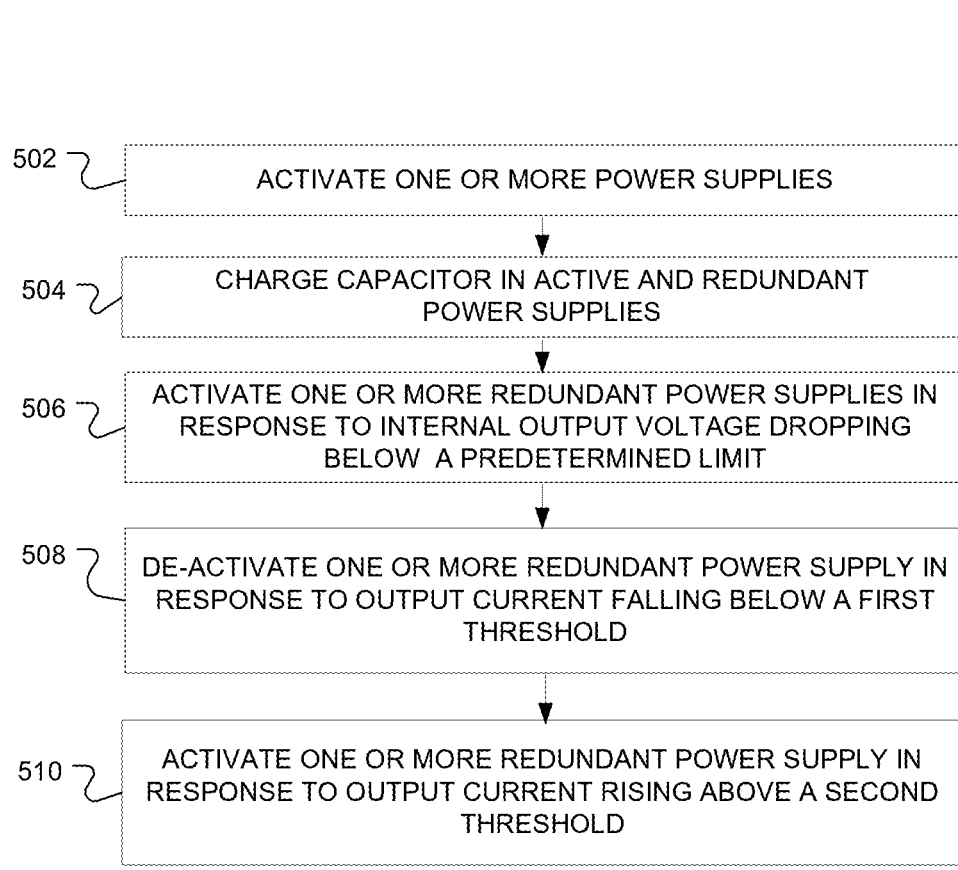
FIG. 5 depicts a flow diagram of a process of managing power output from multiple power supplies, in accordance with an embodiment of the present invention.

FIG. 5 depicts a flow diagram of a process of managing power output from multiple power supplies, in accordance with an embodiment of the present invention. Block 502 may include activating one or more power supplies. For example, an activated power supply may be one or more of power supply PS1 130 of FIG. 1A or power supply PS1 160 of FIG. 1B. Activating a power supply may include enabling soft start of the one or more power supplies.

Block 504 may include charging a capacitor in the active and redundant power supplies. For example, a redundant power supply may be one or more of power supply PS2 140 of FIG. 1A or power supply PS2 170 of FIG. 1B. In the case of PS2 140 of FIG. 1A, charging capacitor 146 may involve using a resistor in parallel with a diode coupled to an output voltage terminal such as the configuration of charging resistor CHR1 144 in parallel with diode 148. In the case of PS2 170 of FIG. 1B, charging capacitor 173 may involve use of charging logic 171 or connection to the output voltage terminal Vo through bypass logic 172.

Block 506 may include activating one or more redundant power supplies in response to the internal output voltage dropping below a predetermined level. For example, the redundant power supply may be power supply PS2 140 and power supply PS2 140 may activate with soft start disabled and using its charged capacitor in response to a voltage at terminal $V_{OL1}$ of power supply PS1 130 falling below a threshold.

Block 508 may include de-activating one or more redundant power supplies in response to the output current falling below a first threshold. For example, a current sensor that measure a current to an output voltage terminal may indicate the output current. De-activating a redundant power supply may reduce energy consumption. The de-activated redundant power supply may be capable to continue to charge its charging capacitor using the output voltage terminal.

Block 510 may include activating one or more redundant power supplies in response to the output current falling below a first threshold. For example, the redundant power supply may be activated with soft start disabled and using its charged capacitor.

Figure 6:
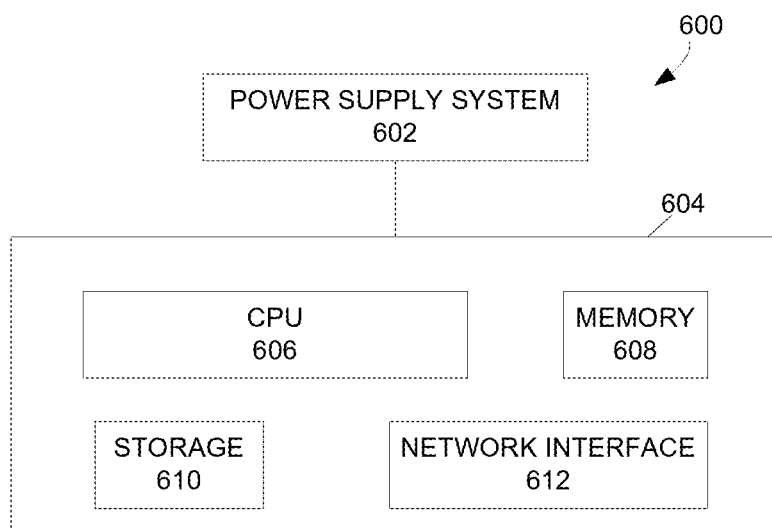
FIG. 6 depicts a system, in accordance with an embodiment of the present invention.

FIG. 6 depicts a system, in accordance with an embodiment of the present invention. System 600 may include a power supply system 602 that supplies power to a computer system 604. Computer system 604 may include a CPU 606, memory 608, storage 610, and network interface 612. Computer system 604 may request powering on of power supply system 602 by transmitting signal PS1_ON. Computer system 604 may receive signal system PWOK from power supply system 602.

In another embodiment (not depicted), fault detection logic may be arranged based on monitoring pulses generated at the HF rectifier output. In another embodiment, output capacitors 136 and 146 are moved to PDL 110.

Charging capacitors could be placed on the PDL similarly to the preloading resistors. In this case, charging resistors are not required, because the capacitors remain charged as long as at least one power supply remains in an active state. Diodes may also be excluded, which would provide cost savings and additional efficiency improvement.

Figure 7:
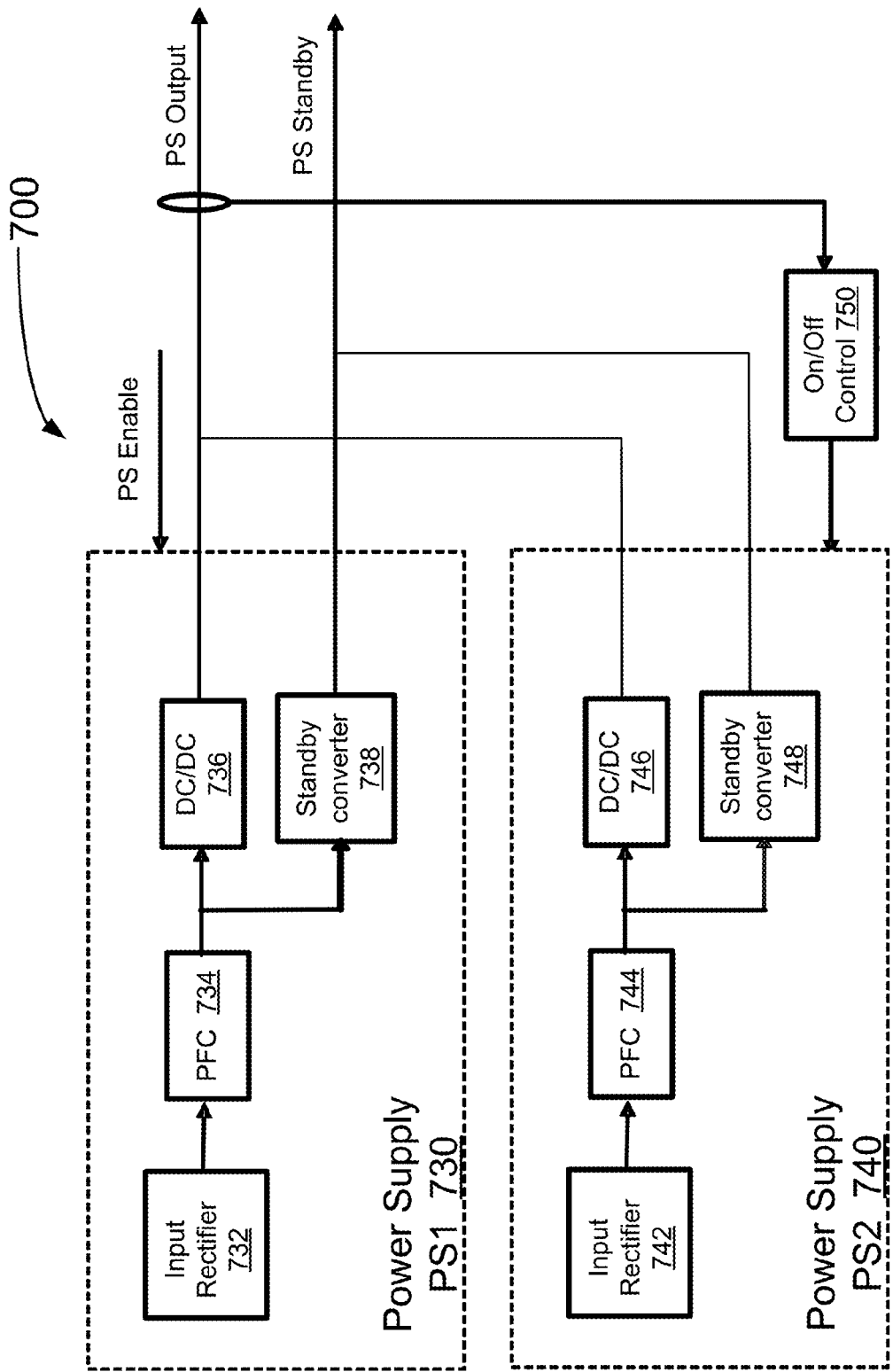
FIG. 7 depicts a power supply system in accordance with some embodiments of the present invention.

FIG. 7 depicts a functional block-diagram of a power supply system 700 (and/or power supply subsystem 700) in accordance with embodiments of the present invention. In some embodiments, power supply system 700 is included in a computing system such as a server system. System 700 may include at least one power supply PS1 730 (or power supply module PS1 730) and at least one redundant power supply PS2 740 (or power supply module PS2 740). Additional power supplies (or power supply modules) can be added to system 700. For example, one or more additional "active" or "master" power supplies (or power supply modules) such as power supply PS1 730 may be added to system 700 and/or one or more additional "standby" or "slave" power supplies (or power supply modules) such as power supply PS2 740 may be added to system 700. In some embodiments of system 700, one or both of power supplies PS1 730 and PS2 740 may output power. In some embodiments of system 700, power supplies PS1 730 and PS2 740 may be implemented in substantially the same manner.

In some embodiments, FIG. 7 illustrates a cold redundant power system 700. Power system 700 includes two or more power supplies (or power supply modules) PS1 730 and PS2 740 that operate in a redundant mode. The redundant mode ensures that a failure of one of the power supplies (or power supply modules) does not result in output power loss. Although FIG. 7 illustrates two power supplies, it is noted that in some embodiments any number of power supplies may be included in system 700.

Power supply PS1 730 includes an input rectifier 732, a Power Factor Corrector (PFC) 734, a DC/DC stage 736, and a standby power converter 738. Power supply PS2 740 includes an input rectifier 742, a Power Factor Corrector (PFC) 744, a DC/DC stage 746, and a standby power converter 748. Outputs of the power supplies (from DC/DC stage 736 and DC/DC stage 746) are coupled in parallel. In this manner the power supplies (or power supply modules) PS1 730 and PS2 740 share a common load. In a similar manner, standby outputs of the power supplies from standby converter 738 and standby converter 748 are coupled in parallel. A Power Supply Enable (PS Enable) signal PS_ON is provided from a computing system such as a server system (not shown in FIG. 7) and is coupled to a single active (or "master") power supply such as power supply PS1 730. In some embodiments, the PS Enable signal PS_ON is coupled to multiple active power supplies. One or more standby (or "slave") power supplies such as power supply PS2 740 is/are a power level controlled power supply that receives a PS Enable (and/or PS_ON) signal from a control circuit such as On/Off Control Circuit 750. In some embodiments, for example, On/Off Control Circuit 750 is a control circuit located on a power distribution board (PDB) that interfaces the power supplies (and/or power supply modules) to a computing system.

In some embodiments, the On/Off Control Circuit 750 and/or the power distribution board (PDB) provides a power share feature, generates a PWOK signal for the system, and supports I2C power supply system communication. In some embodiments, circuit 750 and/or the PDB also process the fault signal of an active power supply (and/or power supply module) and monitor the total power level consumed by the computing system. Once either an active power supply fails or system power exceeds a certain threshold level the circuit 750 and/or PDB enables one or more standby power supplies by providing a power supply enable signal to the power supply or supplies (for example, in some embodiments of FIG. 7 a power supply enable signal is provided by On/Off controller 750 to power supply PS2 740).

During normal operation of system 700, the power consumed and/or the current drawn from the power system 700 varies over a wide range according to some embodiments. If the total current (and/or power) remains below a specified threshold such as a predetermined threshold, the standby power supply (for example, power supply PS2 740) remains in an off state (that is, a cold redundant state).

According to some embodiments, for example, the threshold level is set within a range of 20% to 40% of the maximum current level (and/or power level). In a 1+1 redundant power subsystem the power rating matches one PS rating, so 20-40% of the maximum level relates to either a PS or two PS arrangement, for example. In the multiple redundant PS arrangements (for example, 2+2, 3+1, etc.) there will be several thresholds providing maximum subsystem efficiency at any given load level. For example, in the 2+2 power subsystem the first threshold (when the second PS kicks in) may be set at 40% of a single PS rating (similar to the 1+1 case), second (when the third PS kicks in) may be set at 60% of a single PS rating, and third (when the fourth PS kicks in) may be set at 110% of a single PS rating. These threshold set points depend upon, for example, the PS efficiency curve shape and may be adjusted according in various embodiments.

When the total current (and/or power) exceeds the threshold level, the slave power supply (for example, power supply PS2 740) turns on without any delay and the power subsystem 700 transitions into a hot redundant state in which two or more (or in some embodiments, both power supply PS1 730 and power supply PS2 740) are in an operating state. Once the total current (and/or power) again drops below the threshold level, the standby power supply (for example, power supply PS2 740) turns off and the power subsystem 700 transitions back into the cold redundant state. While operating in the cold redundant state, system 700 consumes less power since a significant portion of fixed losses in the standby power supply 740 is eliminated. In particular, DC/DC stage 746 losses in the standby power supply are eliminated.

While operating in the standby mode (that is in the cold redundant state), the DC/DC stage 746 of the standby power supply PS2 740 is turned off. Further, in the cold redundant state, the power supply PS2 740 still delivers power to system standby circuitry. This power is provided by the standby converter 748. While in the cold redundant state, standby converter 748 receives power from the power factor corrector (PFC) 746 stage, forcing it to operate in a continuous conduction mode. According to some embodiments, despite a fairly high standby converter efficiency (for example, in some embodiments in a range of 0.75 to 0.80), the efficiency of the standby power supply 740 while operating in the cold redundant state mode is relatively low due to the impact of the power losses of the PFC stage 744. For example, in some embodiments, the efficiency of the standby power supply 740 while operating in the cold redundant state mode does not exceed 50% even at a maximum standby power level.

According to some embodiments, the efficiency $Eff_{standby}$ of the power supply PS2 740 while operating in the cold redundant state mode is determined according to the following equation:

$$Eff_{standby} = \frac{P_0}{(P_0 + P_{hc})/Eff_{SBC} + P_{PFC\_fixed}}$$

Where $P_0$ is the total power provided by the standby converter to the system, $P_{hc}$ is the total power provided to the housekeeping circuits within the power supply module (the housekeeping circuits are not illustrated in FIG. 7), $Eff_{SBC}$ is the efficiency of the standby converter, and $P_{PFC\_fixed}$ represents the fixed power losses in the PFC stage associated with switching losses, magnetizing losses in the PFC choke and control power consumption (for example, the fixed power losses in the PFC stage 744).

Figure 8:
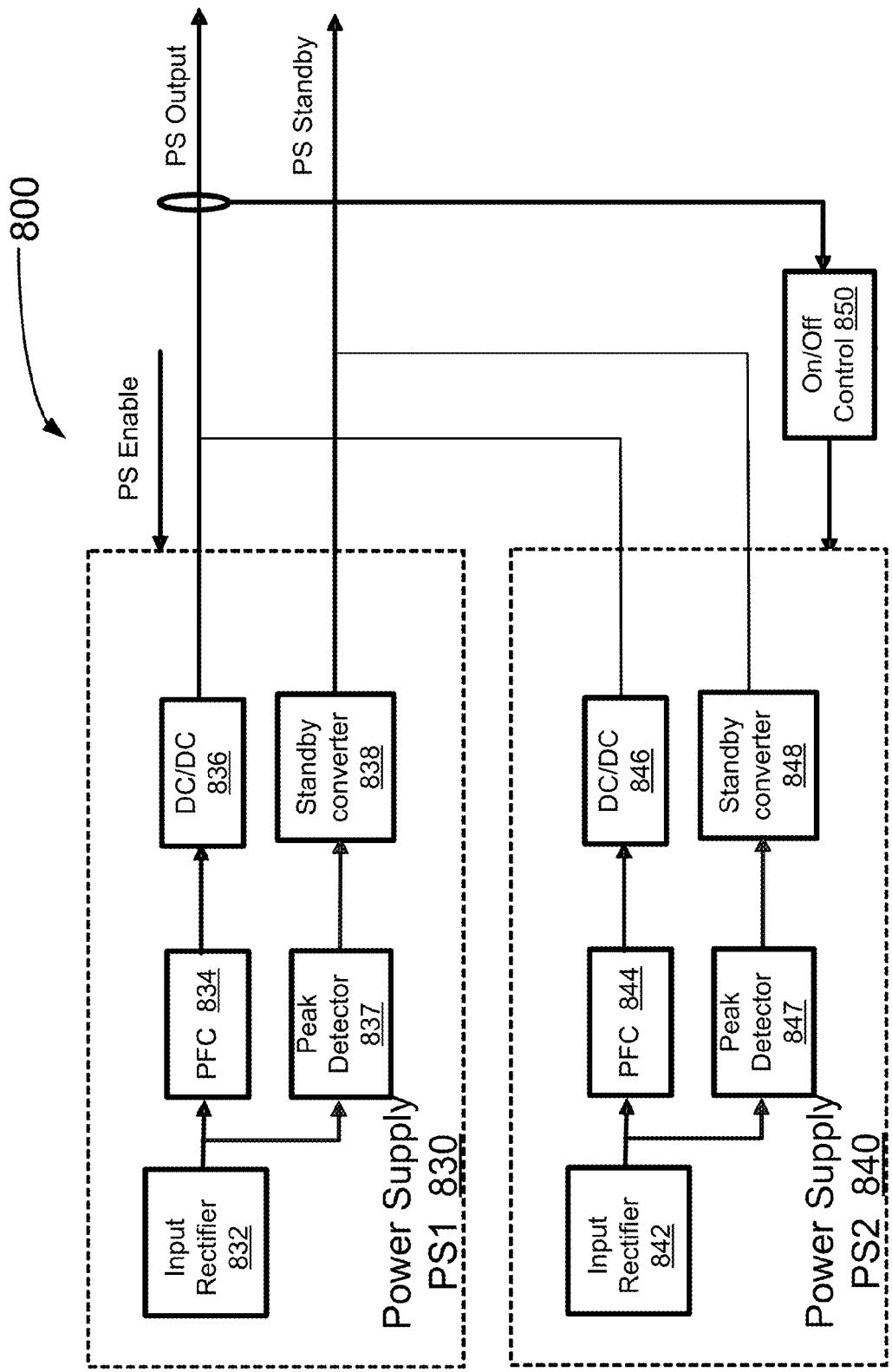
FIG. 8 depicts a power supply system in accordance with some embodiments of the present invention.

For example, if $P_0$=10 Watts, $P_{PFC\_fixed}$=10 Watts, $P_{hc}$=3 Watts, and $Eff_{SBC}$=0.8, the total efficiency in standby mode $Eff_{standby}$ is 38%. Further, in this example, the total power dissipation inside the standby power supply module 740 is 16.3 Watts, calculated according to: $(1/Eff_{standby}-1)*P_0$ FIG. 8 depicts a functional block-diagram of a power supply system 800 (and/or power supply subsystem 800) in accordance with embodiments of the present invention. In some embodiments, power supply system 800 is included in a computing system such as a server system. System 800 may include at least one power supply PS1 830 (or power supply module PS1 830) and at least one redundant power supply PS2 840 (and/or power supply module PS2 840). Additional power supplies (or power supply modules) can be added to system 800. For example, one or more additional "active" or "master" power supplies (or power supply modules) such as power supply PS1 830 may be added to system 800 and/or one or more additional "standby" or "slave" power supplies (or power supply modules) such as power supply PS2 840 may be added to system 800. In some embodiments of system 800, one or both of power supplies PS1 830 and PS2 840 may output power. In some embodiments of system 800, power supplies PS1 830 and PS2 840 may be implemented in substantially the same manner.

In some embodiments, FIG. 8 illustrates a cold redundant power system 800. Power system 800 includes two or more power supplies (or power supply modules) PS1 830 and PS2 840 that operate in a redundant mode. The redundant mode ensures that a failure of one of the power supplies (or power supply modules) does not result in output power loss. Although FIG. 8 illustrates two power supplies, it is noted that in some embodiments any number of power supplies may be included in system 800.

Power system 800 is similar to power system 700, with some differences. Power supply PS1 830 includes an input rectifier 832, a Power Factor Corrector (PFC) 834, a DC/DC stage 836, a peak detector 837, and a standby power converter 838. Power supply PS2 840 includes an input rectifier 842, a Power Factor Corrector (PFC) 844, a DC/DC stage 846, a peak detector 847, and a standby power converter 848. Outputs of the power supplies (from DC/DC stage 836 and DC/DC stage 846) are coupled in parallel. In this manner the power supplies (or power supply modules) PS1 830 and PS2 840 share a common load. In a similar manner, standby outputs of the power supplies from standby converter 838 and standby converter 848 are coupled in parallel. A Power Supply Enable (PS Enable) signal PS_ON is provided from a computing system such as a server system (not shown in FIG. 8) and is coupled to a single active (or "master") power supply such as power supply PS1 830. In some embodiments, the PS Enable signal PS_ON is coupled to multiple active power supplies. One or more standby (or "slave") power supplies such as power supply PS2 840 is/are a power level controlled power supply that receives a PS Enable (and/or PS_ON) signal from a control circuit such as On/Off Control Circuit 850. In some embodiments, for example, On/Off Control Circuit 850 is a control circuit located on a power distribution board (PDB) that interfaces the power supplies (or power supply modules) to a computing system, and is similar to circuit 750 of FIG. 7.

According to some embodiments, FIG. 8 illustrates a functional block diagram of an enhanced cold redundant power subsystem 800 which provides additional efficiency improvements and power savings relative to the power subsystem 700 illustrated in FIG. 7. In the system 800 of FIG. 8, peak detectors 837 and 847 are coupled directly to the output of input rectifiers 832 and 842, respectively, and the standby converters 838 and 848 are coupled to the output of peak detectors 837 and 847, respectively. Once the power subsystem 800 transitions into a cold redundant state (for example, in which power supply PS1 830 operates in an active mode and in which power supply PS2 840 operates in a standby mode), the standby converter 848 of power supply PS2 840 is not being supplied power from the PFC stage

844. Rather standby converter 848 receives power more directly from the input rectifier 842. The PFC stage 844 automatically transitions into a discontinuous conduction mode (or burst mode) in which it performs the function of maintaining charging of an output bulk capacitor. In this mode the PFC stage 844 operates, for example, as a ripple voltage regulator. When the voltage across the output bulk capacitor reaches a minimum regulation level (for example, around 400 volts), the PFC stage 844 turns on for a short period of time required to charge the output bulk capacitor to a maximum voltage regulation level (for example, around 420 volts). The PFC stage 844 then turns off while the output bulk capacitor slowly discharges with a very small primary leakage current formed by high impedance primary voltage monitoring circuits and a low leakage current of the DC/DC stage 846. In this case, fixed losses in the PFC stage 844 may be reduced by a factor of, for example, between ten and thirty times, depending on the ratio of the charging and discharging time intervals. This process is illustrated in FIG. 9 and FIG. 10.

Figure 9:
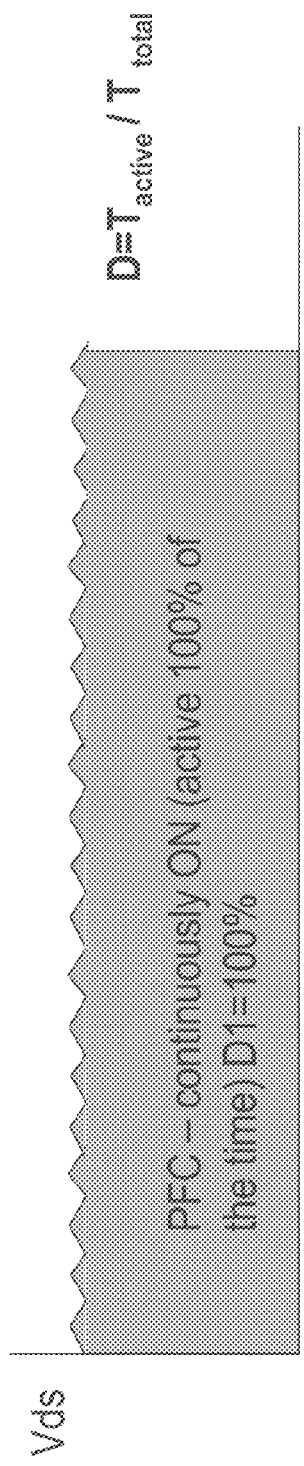
FIG. 9 depicts an example of a signal generated on a PFC MOSFET in accordance with some embodiments of the present invention.

FIG. 9 illustrates the operation of the original PFC circuit shown in FIG. 7. FIG. 9 shows that the PFC power MOSFET is switching continuously with duty cycle D=100%.

Figure 10:
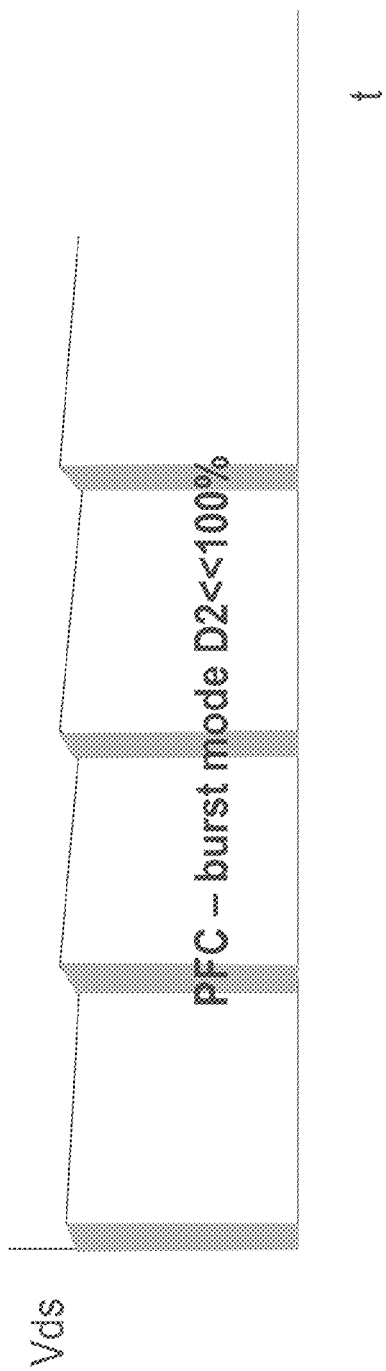
FIG. 10 depicts an example of a signal generated on the PFC MOSFET in accordance with some embodiments of the present invention.

FIG. 10 illustrates the operation of the PFC circuit in the enhanced cold redundant power subsystem 800 of FIG. 8. FIG. 10 shows that the PFC power MOSFET is switching in burst mode with duty cycle D<<100%. Additional duty cycle reduction may be provided by enabling switching of the PFC control on and off with the control circuit 850. When power supply PS2 840 is in the cold redundant state the PFC is operating in the burst mode, supported by the very low load and, if required, by periodical switching the PFC control on and off. Once power supply PS2 840 transitions into active state its PFC 844 is operating in continuous conduction mode.

It is noted that although the bypass PFC stages 834 and 844 and the standby power converters 838 and 848 are coupled to a common input rectifier bridge 832 and 842, respectively, in some embodiments, a separate input rectifier may be provided for the bypass PFC stage and the standby power converter stage in one or more of the power supply modules PS1 830, PS2 840, etc.

In some embodiments, the efficiency $Eff_{standby}$ of the power supply PS2 840 while operating in the cold redundant state mode is determined according to the following equation:

$$Eff_{standby} = \frac{P_0}{(P_0 + P_{hc})/Eff_{SBC} + P_{PFC\_fixed} * D}$$

Where: D is a ratio of the PFC stage 844 ON time interval to the total operation time. For example, in some embodiments, at typical primary leakage currents D is between 0.03 and 0.05 (that is, the PFC stage is on approximately 3% to 5% of the time). Similar to the example in FIG. 7, $P_0$ is the total power provided by the standby converter to the system, $P_{hc}$ is the total power provided to the housekeeping circuits within the power supply module (the housekeeping circuits are not illustrated in FIG. 8), $Eff_{SBC}$ is the efficiency of the standby converter, and $P_{PFC\_fixed}$ represents the fixed power losses in the PFC stage associated with switching losses, magnetizing losses in the PFC choke and control power consumption (for example, the fixed power losses in the PFC stage 844).

For example, similar to the example discussed above in relation to FIG. 7, considering a 2% reduction in $Eff_{SBC}$ from 0.8 to 0.78 due to use of the peak detector 847 instead of the PFC stage 844, and calculating the standby efficiency for a worst case scenario (where D=0.05), if D=0.05, $P_0$=10 Watts, $P_{PFC\_fixed}$=10 Watts, $P_{hc}$=3 Watts, and $Eff_{SBC}$=0.78, the total efficiency in standby mode $Eff_{standby}$ is 58.2%. Further, in this example, the total power dissipation inside the standby power supply module 840 is then 7.1 Watts, calculated according to: $(1/Eff_{standby}-1)*P_0$. This provides a total power savings relative to the example of FIG. 7 of 16.3 Watts–7.1 Watts=9.2 Watts power savings relative to the system 700 illustrated in FIG. 7.

As illustrated in FIG. 8 and described above, the system 800 of FIG. 8 adds a peak detector (for example, peak detector 847) coupled to the output of the input rectifier (for example, input rectifier 842), and further couples the standby power converter (for example, standby power converter 848) to the output of the peak detector. By changing the power supply path to the standby converter, the PFC is automatically transitioned into a burst mode, which provides significant additional power savings as compared to the cold redundant power supply system 700 illustrated in FIG. 7. Further duty cycle reduction in this mode may be provided by periodical switching the PFC control on and off.

In some embodiments, significant energy savings and operating cost reductions for computing platforms (such as, for example, server platforms) may be implemented using redundant power supplies. Further, while running typical applications which consume power much lower than maximum power supply ratings, the system 800 of FIG. 8 can provide an additional 5% to 10% improvement in efficiency over the cold redundancy configuration of the system 700 of FIG. 7, for example.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system, comprising:
two AC-to-DC (alternating current-to-direct current) power supply modules, wherein a first AC-to-DC power supply module is a master power supply and a second AC-to-DC power supply module is a standby power supply, wherein in one mode the second AC-to-DC power supply module is to deliver power to an output terminal, and in another mode the second AC-to-DC power supply module is to provide standby power and to operate in a burst mode.

2. The system of claim 1, wherein the second AC-to-DC power supply module includes an input rectifier, a power correction factor circuit coupled to an output of the input rectifier, a peak detector coupled to the output of the input rectifier, and a standby power converter coupled to an output of the peak detector.

3. A system, comprising:
two power supply modules, wherein a first power supply module is a master power supply and a second power supply module is a standby power supply, wherein in one mode the second power supply module delivers power to an output terminal, and in another mode the second power supply module is to provide standby power and to operate in a burst mode;
wherein a predetermined threshold range of a current level of the system enables maximum subsystem efficiency at any given load level.

4. The system of claim 1, wherein a predetermined threshold range of a power level of the system enables maximum subsystem efficiency at any given load level.

5. The system of claim 1, wherein the AC-to-DC power supply modules share a common load.

6. The system of claim 1, wherein the efficiency of the second AC-to-DC power supply module is:

$$Eff_{standby} = \frac{P_0}{\frac{(P_0 + P_{hc})}{(Eff_{SBC} + P_{PFC_{fixed}})}}.$$

7. The system of claim 1, wherein the efficiency of the second AC-to-DC power supply module is:

$$Eff_{standby} = \frac{P_0}{\frac{(P_0 + P_{hc})}{(Eff_{SBC} + P_{PFC\_fixed} * D)}}.$$

8. The system of claim 1, wherein the second AC-to-DC power supply module is to transition from a standby mode to an active mode in response to a failure of the master power supply.

9. The system of claim 1, wherein the system is to operate in continuous conduction mode.

10. The system of claim 1, wherein the standby power supply is to provide output power in response to an internal voltage of the master power supply being below a threshold.

11. The system of claim 1, wherein the standby power supply is to provide output power only in response to an internal voltage of the master power supply being below a threshold.

12. An apparatus comprising:
two AC-to-DC (alternating current-to-direct current) power supply modules, wherein a first AC-to-DC power supply module is a master power supply and a second AC-to-DC power supply module is a standby power supply, wherein in one mode the second AC-to-DC power supply module is to deliver power to an output terminal, and in another mode the second AC-to-DC power supply module is to provide standby power and to operate in a burst mode.

13. The apparatus of claim 12, wherein the second AC-to-DC power supply module includes an input rectifier, a power correction factor circuit coupled to an output of the input rectifier, a peak detector coupled to the output of the input rectifier, and a standby power converter coupled to an output of the peak detector.

14. The apparatus of claim 12, wherein a predetermined threshold range of a current level of the apparatus enables maximum efficiency at any given load level.

15. The apparatus of claim 12, wherein a predetermined threshold range of a power level of the apparatus enables maximum efficiency at any given load level.

16. The apparatus of claim 12, wherein the AC-to-DC power supply modules share a common load.

17. The apparatus of claim 12, wherein the efficiency of the second AC-to-DC power supply module is:

$$Eff_{standby} = \frac{P_0}{\frac{(P_0 + P_{hc})}{(Eff_{SBC} + P_{PFC\_fixed})}}.$$

18. The apparatus of claim 12, wherein the efficiency of the second AC-to-DC power supply module is:

$$Eff_{standby} = \frac{P_0}{\frac{(P_0 + P_{hc})}{(Eff_{SBC} + P_{PFC\_fixed} * D)}}.$$

19. The apparatus of claim 12, wherein the second AC-to-DC power supply module is to transition from a standby mode to an active mode in response to a failure of the master power supply.

20. The apparatus of claim 12, wherein the standby power supply is to provide output power in response to an internal voltage of the master power supply being below a threshold.

21. The system of claim 3, wherein each power supply module includes an AC-to-DC (alternating current-to-direct current) power supply.

22. The system of claim 21, wherein the AC-to-DC power supplies share a common load.

* * * * *